United States Patent Office 3,434,880
Patented Mar. 25, 1969

3,434,880
STARCH PASTES OF IMPROVED FLUIDITY
René Kircher, Argenteuil, Val-d'Oise, France, assignor to Societe d'Etudes Chimiques Pour l'Industrie et l'Agriculture, Paris, France
No Drawing. Filed May 27, 1966, Ser. No. 553,310
Claims priority, application France, May 31, 1965, 18,891
Int. Cl. C13l 1/08
U.S. Cl. 127—70                     4 Claims This invention relates to the treatment of amylaceous substances such as starches, derived from corn, wheat, rice, potato, sago, manioc, and the like which for purposes of simplification are designated in the following description by the word "starch." More particularly this invention relates to the preparation of starch pastes used for the sizing of thread prior to weaving operations.

It is known that raw starch, as well as starch modified by various treatments, is used in many applications, for example: as flotation and settling agents, as binders for foundry molds, as additives for drilling muds, as stabilizers, thickeners or diluents in the food industry, as sizes in the textile industry, and as sizing and and coating compositions in paper manufacture.

In the preparation of sizes for the textile industry, a starch paste is conventionally employed. It is used for cotton thread, linen, wool and jute yarn, as well as for thread made of artificial or synthetic fibers either pure or mixed, such for example as polyester-cotton, polyamide-cotton, and the like.

The function of the starch paste is to size the warp threads in order to protect their surface and thereby make them more resistant to the strain of weaving. For the threads to be sufficiently protected, it is essential that the deposit of size be as even and uniform as possible. Towards this end, many efforts have been made to modify the viscosity of the starch pastes before the threads are coated therewith. The viscosity of starch pastes for application to threads is very important because upon the viscosity depend the other operating conditions of squeezing and coating steps.

It has already been proposed to reduce the starch viscosity by adding different products to the starch pastes during their preparation, for example addition of electrolytes or glucose to potato starch, but most often such additives will cause various chemical reactions which make the use of these mixtures very sensitive to control. It has also been suggested to reduce the viscosity of the sizes by employing modified starches such as thermally degraded starch, swelling starch, or starch ethers, however; in order to prepare a sizing bath having the desired viscosity, the conversion of these substances must be carried to such a point that the cost of the process is considerably increased thereby.

It is also known to convert starch by an enzymatic treatment in which an enzyme is added to the aqueous starch slurry; then the starch mixture is heated to reduce the viscosity, and an enzyme deactivator is added to the mixture. However, these operations are lengthy and require accurate control by qualified personnel. Furthermore, in many case the viscosity of the resultant products does not remain stable.

An object of this invention, therefore, is to provide an improved starch paste for the sizing of thread prior to weaving.

Upon further study of the specification and claims, other objects and advantages of the present invention will become apparent.

To obtain the objectives of the invention, an aqueous starch slurry is treated with a small quantity of alkali metal bromite or alkaline earth metal bromite not exceeding 0.5% by weight of available bromine in form of bromite relative to the weight of dry starch to be treated. (Available bromine is four times the bromine content in the bromite in the solution.)

It has been found that when starch is treated with a small amount of bromite, some of its characteristics are improved and, in particular, the fluidity of its aqueous solution is considerably increased. Due to this greater fluidity, the deposit of starch paste on the threads is lower than when using a product having the same concentration but prepared with untreated starch. Conversely, by means of this invention, the concentration of amylaceous substance in the sizing bath can be increased without a concomitant increase in viscosity as compared to untreated starch. Thus, it is possible to use less water for the preparation of sizing baths of a predetermined viscosity.

A resultant significant advantage of the process of the present invention is, therefore, a noticeable reduction in the costs of drying the sized threads. The drying operation is most important in the preparation of the threads prior to weaving. It must be effected gently, gradually and evenly so as to prevent the starch paste deposit from becoming brittle, hard and fragile. When using the product of this invention containing a reduced quantity of water to be evaporated, the control of the drying operation is easier than when using the usual product containing a relatively small quantity of starch in a large amount of water. In addition, a starch paste treated according to the process of the present invention can be dried more quickly and, of course, with a lower quantity of heat than a starch paste which has not been treated. In spite of a quicker drying, the obtained deposit of starch is of good quality and retains its plasticity.

Still another advantage of this invention is obtained in the form of a lower energy requirement to operate the stirring device, the power consumption being thus lowered by one-half to two-thirds. Besides, when using the starch pastes prepared according to the process of the present invention, the sizing machine can be operated at a greater speed which notably increases its output capacity.

In general the concentration of the starch paste obtained by this invention is in the range of 3 to 30, preferably 5 to 20 parts by weight of dry substance per 100 parts by weight of paste.

It is to be appreciated that the addition of a finite amount of bromite will result in a small but finite reduction in the viscosity of the raw starch. As a matter of fact, it has been found that with a quantity as low as 0.1% by weight of available bromine in form of bromite relative to the weight of dry starch, the viscosity of the starch pastes obtained is noticeably lower than that of pastes made from untreated starch. In practice, quantities ranging between 0.1% and 0.3% of available bromine give particularly good results. With the addition of larger quantities of available bromine, a further reduction of the viscosity is less noticeable.

The starch pastes are usually produced in a heated, agitated kettle or equivalent device. The operating temperature is maintained at a value higher than the gelatinization temperature of the treated starch and generally at about 80 to 100° C., and the mixture of water, starch and bromite is agitated. In order to achieve a constant viscosity of the starch paste the cooking is continued during at least 30 minutes and preferably between 45 to 75 minutes.

Any alkali or alkaline earth metal bromite can be used, such as, for example, sodium, potassium, lithium, magnesium, calcium, strontium, and barium but preferably there is used a solution of sodium bromite available in commerce. By the addition of a quantity of this commercial solution such that the starch paste contains not more than 0.5% by weight of available bromine, the initial pH of the paste is generally between 10 and 11. During the cooking the pH value decreases and there is obtained a starch paste having a pH near neutral and generally about 6 to 7.5.

It is an advantage of the present process to obtain directly without special adjustment a starch paste having a near neutral pH which is the desired value for warp sizing. In the resultant paste is found the corresponding amount of alkali metal or alkaline earth metal bromide resulting from the reaction:

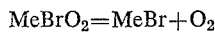
$$MeBrO_2 = MeBr + O_2$$

It is also to be mentioned that mechanical properties such as abrasion resistance and tensile strength of the cotton warp sized with a starch paste prepared according to the present process are not deleteriously altered, and even are improved when the starch is treated with not more than 0.5% by weight of available bromine in the form of bromite.

Since it is meaningless to determine the viscosity of starch products which are non-newtonian fluids, it has been tried to compare the apparent consistencies of the paste prepared after 70 minutes' cooking with and without the addition of bromite in a viscosigraph-cooker provided with a blade rotating at 115 r.p.m.: the values thus obtained were decreased from 29 to 7, expressed in arbitrary units. This experiment shows that the addition of 0.2% by weight of available bromine in the form of bromite decreases considerably the consistency of a starch paste, and hence increases correspondingly its fluidity.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

PREPARATION OF THE STARCH PASTES

The pastes were prepared with demineralized water in a viscosigraph-cooker, that is a cooking vessel provided with a stirrer revolving at a constant speed, and a viscosity measuring device by which a continuous, graphical record is traced over the entire period of the test. A cold potato starch slurry (1950 g.) was poured into the preheated (65° C.) cooker, then the stirring was started without covering the vessel. Immediately after the starting of the agitation, the necessary quantity of sodium bromite diluted with an amount of water sufficient to obtain 50 g. of solution was added to the cooker, and the cover was then placed on the latter. The mixture was left to cook for one hour, the temperature being maintained at 95° C.

With the same demineralized water and under the same conditions, a reference starch paste was prepared, but without any addition of bromite.

Example 1

A starch paste containing 14% by weight of potato starch and 0.2% of available bromine in form of sodium bromite was prepared as described above. The starch paste obtained was used to size a single sheet of 10 parallel cotton yarns, at a temperature of 80° C., the yarns passing at a speed of 10 m./min. After the application of the sizing, the yarns were dried in hot air at 90–110° C. The starch deposit was 21%.

A comparative test was conducted with the objective of obtaining a similar amount of deposit from a starch paste of untreated starch. In order to obtain a 19.1% deposit, the dry starch content had to be reduced to 7%, the result being an increase in the water content that had to be eliminated by drying. The drying time and drying costs were increased accordingly.

Example 2

Example 1 was repeated, but with a higher squeezing rate. With a starch paste containing 14% of potato starch and 0.2% of available bromine in form of sodium bromite, the starch deposit obtained was 15.1%.

In order to obtain a similar deposit (15.5%) when using a starch paste made with untreated potato starch, the content of dry substance has to be reduced to 7.5%.

Example 3

A starch paste was prepared as in preceding examples, but by using 15% by weight of corn starch and 0.4% of available bromine in form of sodium bromite. The yarns were sized under the same conditions as in Example 1, the resultant corn starch deposit being 25.9%.

Comparative tests were conducted in order to obtain a similar starch deposit from a paste prepared under the same conditions as Example 3, with with a known oxidizing agent, sodium hypochlorite.

In this case, it was found that, all other conditions being equal, 2.5% of available chlorine in form of hypochlorite must be used to obtain a corn starch deposit which amounts to only 21%.

Moreover, it was observed that by using bromite according to the present process, the main characteristics of pastes prepared from various kinds of starches are quite similar wherein the hypochlorite treatment gives very scattered results. Another important advantage of the present invention is therefore that sizings having a substantially constant quality can be produced from different starches.

U.S. Patent No. 3,083,072 (assigned to Société d'Etudes Chimiques pour l'Industrie et l'Agriculture) discloses that starch-sized textile fabrics can be treated with bromite to oxidize the starch to such an extent that it can be completely and easily removed from the textile fabric. The object of the present invention on the opposite is to modify slightly the starch so that the fluidity of the starch paste is increased without its sizing power being lowered.

Indeed it is well known to prepare sizing products by treating starch with various oxidizing agents, and in particular hypochlorites, which, even in large quantities, have substantially no desizing action. Because of the abovementioned oxidizing power it could be feared that bromite at any concentration would react too strongly on starch and its mild action, according to the present invention, could not be expected.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for preparing starch pastes of improved fluidity, said process consisting essentially of admixing with an aqueous slurry of raw starch a viscosity lowering agent consisting essentially of bromite selected from the group consisting of an alkali metal bromite and an alkaline earth metal bromite in a quantity not exceeding 0.5% by weight of available bromine in the form of bromite relative to the weight of dry starch treated and agitating resultant alkaline aqueous slurry for a sufficient time to lower the pH of the slurry to about 6–7.5.

2. A process as defined by claim 1, wherein said process is conducted at 80–100° C. for 45–75 minutes.

3. A process as defined by claim 1 wherein the quantity of bromite used is between 0.1% and 0.3% of available bromine relative to the weight of dry starch treated.

4. A process as defined by claim 3, wherein said process is conducted at 80–100° C. for 45–75 minutes.

References Cited

UNITED STATES PATENTS

| | | | |
|---|---|---|---|
| 2,053,012 | 9/1936 | Meulen | 106—213 |
| 2,053,013 | 9/1936 | Meulen | 106—213 |
| 2,409,085 | 10/1946 | Vincent | 127—33 |
| 2,980,556 | 4/1961 | McClelland | 117—139.5 X |
| 3,051,699 | 8/1962 | Glasscock et al. | 117—139.5 X |
| 3,083,072 | 3/1963 | Leclerc | 8—108 X |

MORRIS O. WOLK, Primary Examiner.

S. MARANTZ, Assistant Examiner.

U.S. Cl. X.R.

127—33, 32; 106—210, 213